Patented Jan. 16, 1934

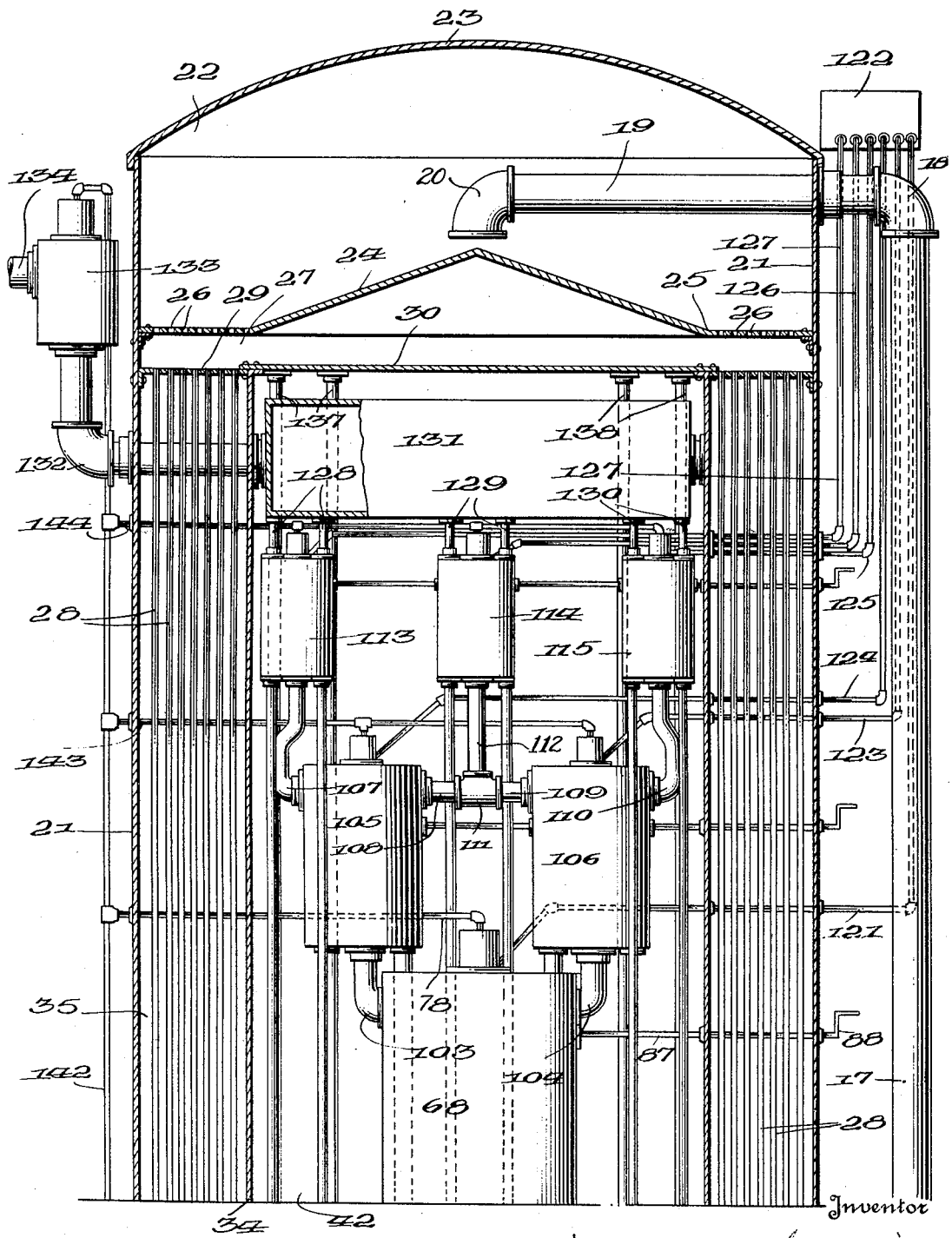

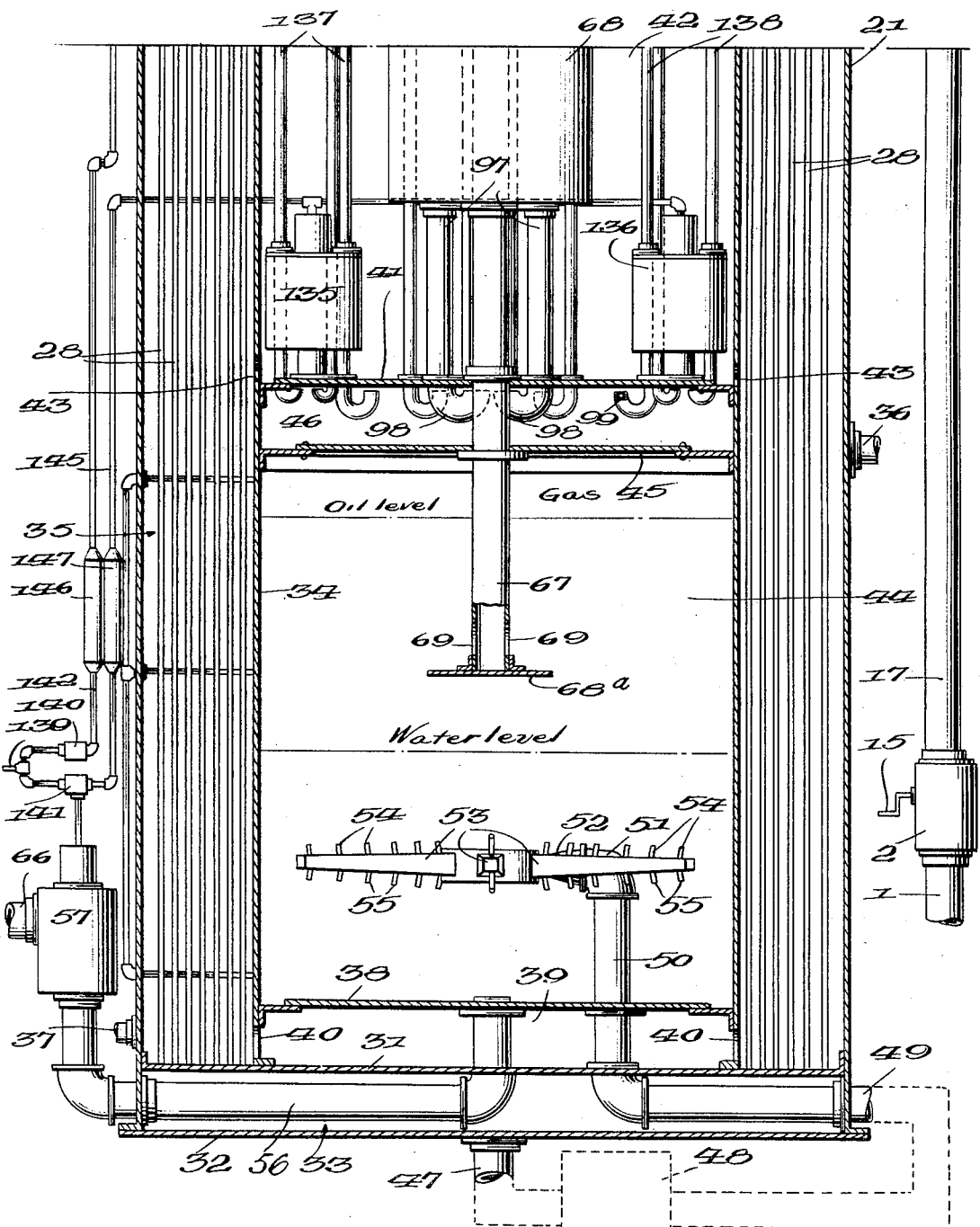

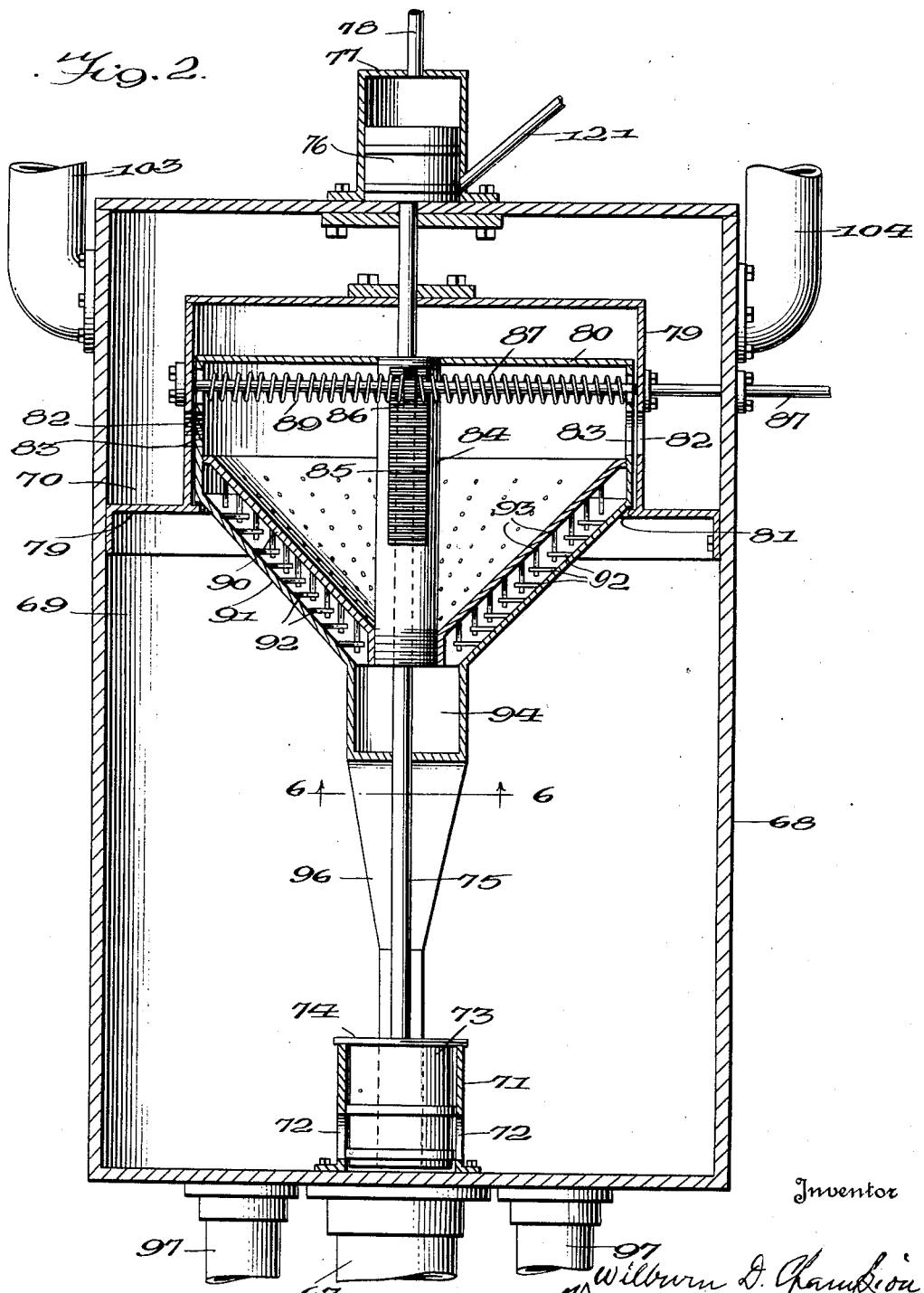

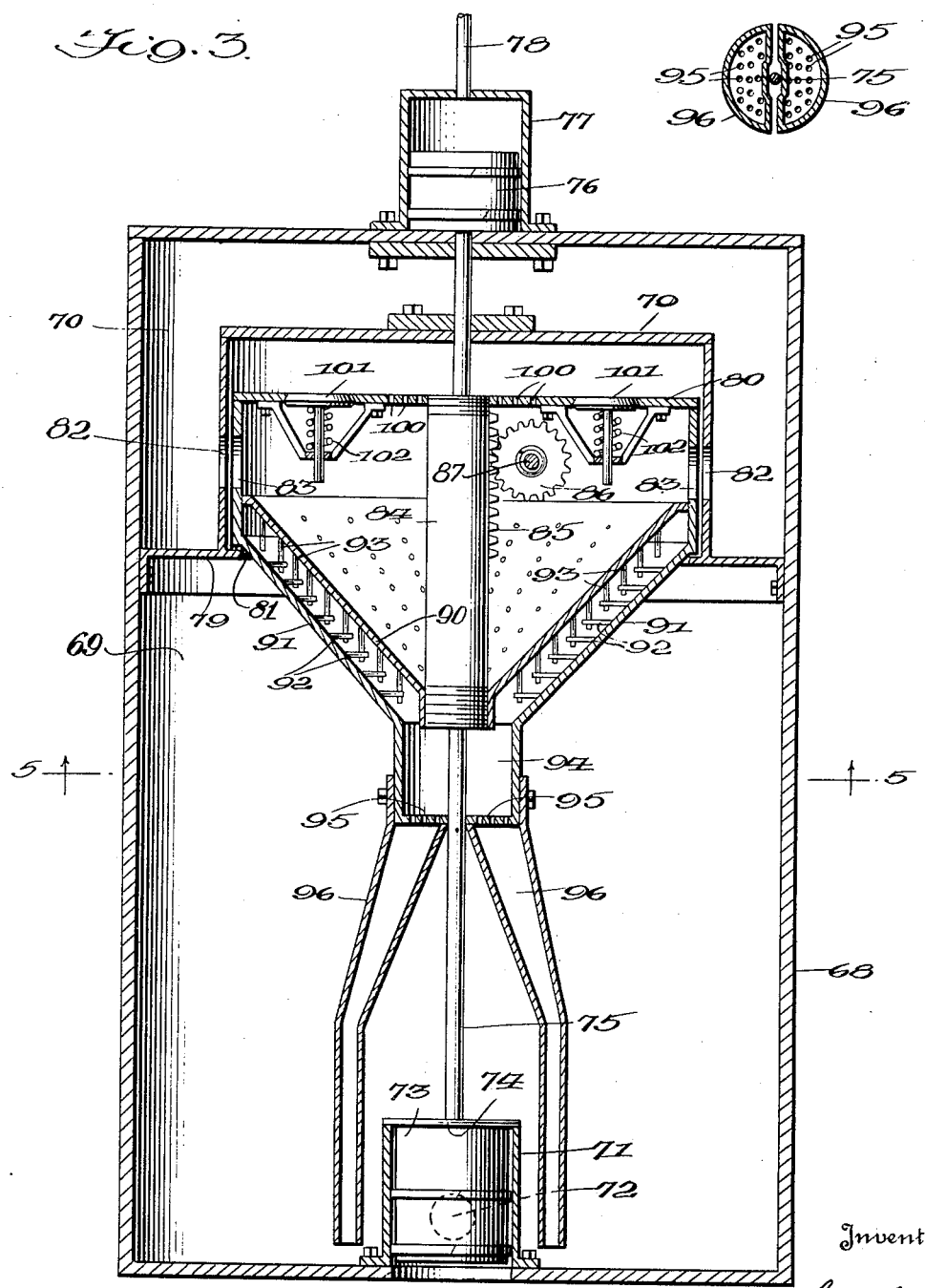

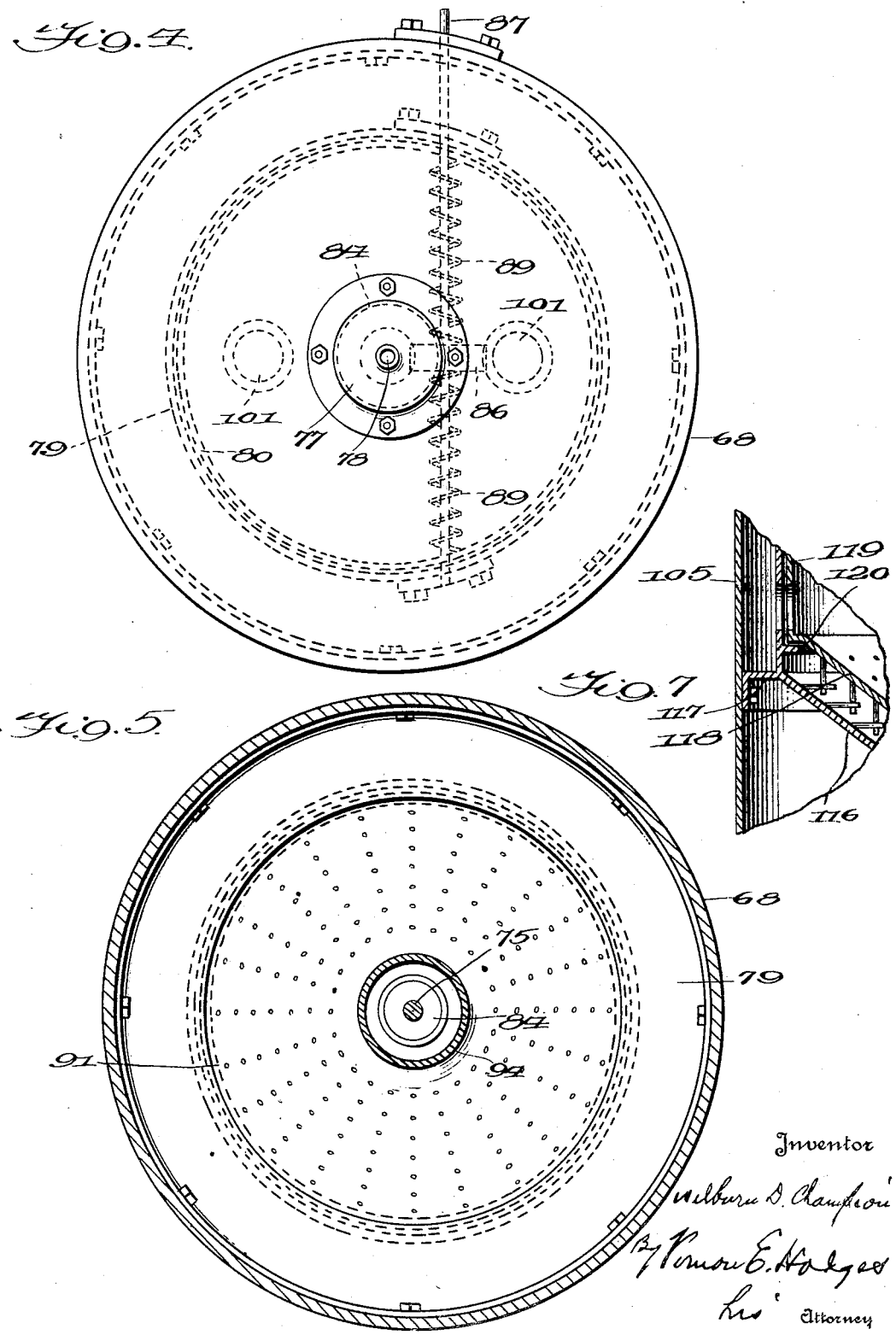

1,943,368

UNITED STATES PATENT OFFICE 1,943,368

OIL AND WATER SEPARATOR AND PETROLEUM PURIFIER

Wilburn D. Champion, Pampa, Tex.

Original application March 19, 1929, Serial No. 348,249. Divided and this application May 21, 1930. Serial No. 454,491

17 Claims. (Cl. 210—59)

This invention relates to an improvement in oil and water separator, and petroleum purifier, and is a division of my prior application Serial No. 348,249, filed March 19, 1929.

The object of the invention is to separate oil from water and other impurities and to purify the oil at the same time as the separation, taking out all impurities which are obtained from the oil well, such as water, becknite, shale, wax, salt, sulphur, acids of different kinds, and many other substances which are contained in the crude oil as it is withdrawn from the well. These substances are very injurious to the oil and are also expensive to refineries and producers.

Heretofore, it has been very difficult and almost impossible to extract foreign substances and all of the water from the crude oil produced, and this invention is perfected for such purposes and to reduce the expense and trouble incident to attempts to remove such foreign substances as well as to produce a more valuable grade of oil with a higher gravity.

The present invention is in the nature of a separator to be placed near tank batteries or other convenient location to production in such position as to separate all of the water and foreign substances from the crude oil without the loss of any of the oil.

This invention not only automatically separates the water from the oil with much less expense but also prevents the possibility of fire, which frequently occurs at present from waste oil draining from tank batteries through water bleeders. It also eliminates the great expense to producers of installing so many tanks, which they are forced to do to take care of excessive production because of the presence of water in the oil. The water and all foreign substances are extracted from the oil as it is purified with the present invention before the oil is directed into stock tanks, thereby preserving the tanks as well as eliminating the use of as many as heretofore required.

The present invention relates more particularly to the construction of a separating valve which may be used with the system set forth in the above-mentioned application, of which this is a division. The system is covered in my said application, and this application is directed to the separating valve structure.

In the accompanying drawings:

Fig. 1a designates a sectional view through the upper portion of the separator and purifier system;

Fig. 1b is a similar view through the lower portion;

Fig. 2 is a sectional view of my automatic separating valve;

Fig. 3 is a similar view of the same taken approximately at right-angles to Fig. 2;

Fig. 4 is a top plan view of the separating valve;

Fig. 5 is a horizontal sectional view on the line 5—5 of Fig. 3;

Fig. 6 is a sectional view on the line 6—6 of Fig. 2; and

Fig. 7 is a detail sectional view of a modification in the separating valve.

In the production of crude oil, there are many different kinds of water, oil and acids that occur in the crude oil as withdrawn from the oil wells. There are three different kinds of water that frequently occur in crude oil when the oil is extracted from the earth, namely soft water, salt water and dead-sea water. The acids which are the most important are usually sulphuric and muriatic. The crude oils are usually those with paraffin or asphalt bases.

A test table for these is as follows:—

| | Weight per gal. | Approx. gravity | Friction |
|---|---|---|---|
| *Water* | | | |
| Soft water | 8# | 10 | 30% |
| Salt water | 10# | 8 | 45% |
| Dead-sea water | 10½# | 6 | 65% |
| *Acids* | | | |
| Sulphuric acid | 15½# | 20 | 80% |
| Aqua regia acid | 15# | 25 | 45% |
| *Crude oils* | | | |
| Paraffin base | 5# to 8# | 10 to 66 | 5% to 8% |
| Asphalt base | 6# to 10# | 8 to 40 | 6% to 10% |

When the waters are placed under a temperature of 200° F. and fifty pounds working pressure, the friction is raised and the gravity lowered. There is a very small change in the acids contained in the crude oil, but when the crude oils go through the same process, the gravity is raised and the friction lowered.

The friction of crude oils, waters and acids may be best understood by the following illustration:—

A gallon of crude oil forced through a specially built machine having a relatively small coil tube of a size of six feet by one-sixteenth inch, with a fluid speedometer, and placed under a working pressure of fifty pounds and 200° F., the gallon of oil will pass through the tube at a predetermined speed and in a definite length of time. This time and speed in which it takes for the oil to pass through the tube at a fixed pressure and temperature determines the friction which the fluid has.

Referring to the accompanying drawings which illustrate one form of the separator and oil purifying system, the numeral 1 designates a pipe connected with a flow tank for the purpose of withdrawing the crude oil therefrom, which crude oil thus withdrawn contains the impurities which are in it as withdrawn from the earth. The crude oil or fluid may be forced through the pipe 1 by a suitable pump connected therewith or by suction or vacuum applied to the opposite end of the system, which will serve to force or draw the fluid through the pipe.

The pipe 1 is connected with an inlet regulating valve designated generally by the numeral 2.

Communicating with the upper end of the valve 2 is a suction pipe 17 extending upwardly therefrom and turned inwardly as at 18 in a horizontal position 19, which has a discharge nozzle 20 on the inner end thereof for discharging the oil and fluid in a general downward direction. The horizontal section 19 of the suction pipe extends through the outer wall 21 of the separator and the discharge nozzle 20 is located in the upper inlet chamber 22 closed at its top by a header plate 23.

The nozzle 20 discharges the oil immediately over and in relatively close proximity to the apex of a conical division shield 24, which terminates at its lower edge in a horizontal flange 25 provided with relatively small holes 26 therein, which communicate with a chamber 27. The holes 26 are arranged around the cone 24, as shown in Fig. 1ª, so that the crude oil may flow down the sides of the conical shield 24 and through the holes 26. The conical shield 24 is securely fastened at its outer edge to the outer casing 21 of the separator.

Located immediately beneath the holes 26 and below the chamber 27 are a large number of tubes 28, having their upper ends mounted in a ring 29, secured at its outer edge to the casing 21 and at its inner edge to a plate 30, which serves to form the bottom of the chamber 27 and to close the chamber at the center. At their lower ends, the tubes 28 are mounted in a plate 31 spaced above the bottom 32 of the casing 21 of the separator and forming a chamber 33 therebetween, into which the tubes 28 discharge.

An inner casing 34 of smaller diameter than the outer casing 21 and spaced from the walls thereof has its upper end fixed to the plate 30 and its lower end to the plate 31, forming a heating chamber 35 between the casings 21 and 34 for the reception of steam.

The steam is admitted to this heating chamber through the pipe 36, shown in Fig. 1ᵇ and is adapted to surround the tubes 28 to heat the fluid or crude oil passing therethrough and maintaining a constant temperature, and it also supplies heat to the entire separator. Any condensed liquid from this steam may be withdrawn at the bottom of the chamber 35 through a pipe 37.

A division plate 38 is arranged within the inner casing 34 and spaced above bottom plate 31 forming an auxiliary heating chamber 39 between the plates 31 and 38, which communicates with the heating chamber 35 through the port holes 40 in the sides thereof.

A header plate 41 is also provided within the inner casing 34 in the intermediate portion of the separator, forming a heating compartment 42 within the inner casing 34, which also communicates with the heating chamber 35 through port holes 43, receiving steam therethrough for the heating purposes and allowing the discharge of any products of condensation.

Arranged within the inner casing 34 and above the plate 38 is a breaking and united receiving compartment 44, which is closed at its top by means of a plate 45 fixed at its outer edges to the inner casing 34. Arranged between the plates 41 and 45 is a water and oil chamber 46. This will be hereinafter referred to.

A suction pipe 47 extends from and communicates with the bottom chamber 33 of the separator for directing the crude oil therefrom, and this pipe extends to and is connected with a pump 48, shown diagrammatically in Fig. 1ᵇ, from which the crude oil is pumped through a pipe 49, which extends through the bottom chamber 33 and is then directed upwardly with a vertical section 50, and again horizontal as at 51, terminating in a reducer 52, which communicates with a lubricator 53. This lubricator may be in the form of a six-pointed star and tubular for the reception of the crude oil from the reducer 52.

The lubricator 53 is arranged approximately horizontally within the breaking and united receiving compartment 44 and below the water level line therein. As the crude oil is forced through the pipes relatively slowly, the oil being lighter than the water and other impurities, will have a tendency to accumulate above the surface of the water. As the oil, water and acids, forming the crude oil, flow into the lubricator 53, therefore the oil automatically assumes a position over the water and impurities. Arranged around the lubricator 53 and in the top thereof are upwardly inclined tubes or discharge nipples 54, for allowing the oil to flow upward from the lubricator. Similar nipples 55 are provided in the bottom of the lubricator to allow the downward passage of the water and acids. The nipples 55 may be slightly larger than the nipples 54 and may be arranged vertically.

The inclination of the nipples 54 and the relatively small size of these serves the purpose of breaking the body of oil which flows from the lubricator 53. As the crude oil containing the water and acids is forced through the lubricator 53 under pressure, the water being heavier will assume a lower position and have a tendency to flow downward through the nipples 55 while the oil will flow upward through the nipples 54, thereby breaking up the fluids and separating a large portion of the water and impurities from the oil.

The acids and foreign substances being of a similar gravity as water will, to a large extent, remain in the water by this arrangement of distribution.

This breaking up of the crude oil therefore forms in the chamber 44 a lower body of water containing a large portion of the foreign substances and acids, above which is disposed the oil, from which at least some of the impurities have been removed in the breaking up process, and because of the cracking of the oil during the breaking up process, a certain amount of gas is liberated, which accumulates above the body of the oil.

A pipe 56 extends from the bottom of the breaking and united receiving compartment 44 through the outer casing 21 of the separator and communicates with an automatic pressure regulating valve 57 for withdrawing the impurities from the compartment 44.

A pipe 66 extends from the valve 57 for carrying off the water and impurities withdrawn from the separator.

When oil is pumped into the lubricator 53 and discharged therefrom into the breaking and united receiving compartment 44 by reason of the pressure placed thereon, which creates a pressure on the gas contained in the top of the compartment 44 above the oil level, and when this gas is compressed to a predetermined extent, this will act to force the water from the bottom of the compartment 44 through the pipe 56 and the valve 57, allowing a discharge of the water and acids through the pipe 66.

In order that this oscillation within the compartment 44 may also force the oil therefrom, a delivery pipe 67 extends downwardly into the compartment 44 only into the body of the oil contained therein. The pipe 67 is closed at its lower end by a plate 68$^a$ and is provided with inlet holes 69 in the sides thereof immediately above the plate 68$^a$ for the admission of the oil into the pipe 67 and the forcing of the oil out of the compartment 44 through the pipe 67 by means of the pressure of the gas contained within said compartment. The oil and water is forced out of the compartment by the gas pressure until the pressure is reduced. This oscillation process is for the purpose of assisting gravity and friction to break up the water, acids and foreign substances from the oil.

A master valve which constitutes the subject matter claimed in this application is designated by the numeral 68 and is shown in detail in Figs. 2 to 7. This valve has the casing thereof divided into upper and lower chambers 69 and 70. Disposed within the lower chamber 69 at the bottom thereof is a fluid cylinder 71, communicating at its lower end with the pipe 67 for receiving the oil therefrom. The fluid cylinder 71 has openings 72 in the sides thereof controlled by a piston 73. The piston 73 extends approximately throughout the length of the cylinder 71 and is provided with a flange 74 for closing the outer end of the cylinder. A connecting rod 75 extends from the piston 73 to a piston 76 disposed within an air cylinder 77 located above the valve casing 68. The opposite ends of the cylinder 77 are closed and the outer end has an air-pipe 78 communicating therewith for supplying air pressure to act on the piston 76, normally tending to hold the piston 73 in its lowermost position.

A cylinder 79 serves to divide the casing 68 into the compartments 69 and 70, being disposed between the compartments, and this cylinder 79 has an adjusting piston 80 mounted therein, being retained in the cylinder 79 by reason of the lug or projection 81 formed at the lower end thereof. Aligned openings 82 and 83 are provided in the sides of the cylinder 79 and piston 80 respectively for the purpose of establishing communication between the interior of the piston 80 and the upper chamber 70.

For the purpose of regulating the extent of this communication and the position of the piston in the cylinder 79, a mandrel 84 is fixed to the piston 80 and provided with teeth 85 to mesh with a pinion 86 for adjusting the position of the mandrel and piston. The pinion 86 is loosely mounted on a shaft 87 journaled in the cylinder 79 and extending therefrom through the casing 68 and the casings 34 and 21 of the separator to the outside of the latter, where it terminates in a handle 88 by which the shaft may be adjusted to turn the pinion for adjusting the position of the piston. Sleeved over the shaft 87 on opposite sides of the pinion 86 are oppositely coiled springs 89, having their inner ends fixed to the pinion 86 and their outer ends fixed to the shaft 87, so that upon rotation of the shaft the movement thereof will be communicated through the springs 89 to the pinion 86 to turn this pinion.

Internal and external inverted cone-shaped shields 90 and 91 respectively have their outer edges joined and secured to the walls of the piston 80, and are arranged in spaced apart relation, as shown in Figs. 2 and 3, forming the bottom of the piston 80. The external shield 91 carries a relatively large number of small inlet tubes 92 extending in a horizontal direction into the space between the shields 90 and 91 and sufficiently minute for the purpose of breaking the volume of oil to very small bits.

The inner shield 90 carries a large number of small tubes 93 that are arranged vertically to allow the oil to flow from the space between the shields into the piston 80, from where it is forced through the openings 82 and 83 into the upper chamber 70 of the valve. As the oil rises in the chamber 69 and flows through the inlet tubes 92, the oil, being lighter in weight than the water contained therein, will have a tendency to rise to the top surface of the water and through the tubes 93 into the piston, thence to the upper chamber 70, while the water and foreign substances, being heavier and more affected by gravity, will strike the internal shield 90, being arranged at an angle of approximately 45° and will be deflected downwardly therefrom into the receiving cell 94 at the lowest point of the outer shield 91, from which it flows through the holes 95 in the bottom of this cell, as shown in Fig. 3, into and through channels 96, which extend down on opposite sides of the fluid cylinder 71 and to points in close proximity to the bottom of the valve casing 68 for discharging the water and foreign substances into the immediate bottom of the casing at points approximately below the openings 72 of the cylinder 71.

Pipes 97 extend downwardly from the bottom of the casing 68 for carrying this water and foreign substances downward into the water and oil chamber 46. The pipes 97 may terminate in goosenecks 98, within which may be disposed valves 99 of suitable construction for maintaining the liquid in the chamber 46 at a proper height.

In order to brace the inner shield 90, it is connected at its lower end to the mandrel 84, as shown in Figs. 2 and 3.

As the piston 80 may be adjusted upwardly within the cylinder 79, small openings 100 may be arranged in the top of the piston 80 to allow a slight circulation of air or gas from within the piston 80 into the space above the piston to prevent the creation of a vacuum thereabove, whenever the piston is lowered in the cylinder 79. Valves 101 are mounted in the top of the piston 80, as shown in Fig. 6, and normally pressed upwardly or closed by springs 102, but are adapted to be opened whenever the piston 80 is moved upward in the cylinder 79 to automatically release the air or gas from within the space above the piston into the piston so as not to create an undesirable pressure above the piston and acting thereon.

Arranged above the master valve 68 is a series of similar separating valves through which the oil is successively passed for the removal of any impurities contained therein and not removed by the master valve.

Extending upwardly from opposite sides of the upper chamber 70 of the master valve 68 are pipes 103 and 104, which extend respectively to subsidiary valves 105 and 106. Extending from corresponding portions of this first set of subsidiary valves 105 and 106 are similar pipes 107, 108, 109 and 110. The pipes 108 and 109 are joined together as at 111, from which the pipe 112 extends upwardly. The pipes 107, 112 and 110 respectively extend to the second set of subsidiary valves 113, 114 and 115. The two sets of subsidiary valves 105, 106, 113, 114 and 115 are all of approximately the same construction and operation as the master valve 68, such as illustrated in Figs. 2 to 6 inclusive, with the exception of the slight change shown in Fig. 7, in which the outside conical shield 116 is formed on and as a part of the cylinder 117, while the inside shield 118 forms the bottom of the piston 119, being retained in position by a flange or rib 120. Otherwise, the construction is the same and need not be described in detail.

Extending from the base or lower end of the air cylinder 77, as shown in Figs. 1ª and 2, is a breather and lubricator pipe 121, which communicates with the internal surface of the cylinder 77 and extends therefrom to the breather and lubricating box 122, as shown in Fig. 1ª.

Similar pipes 123, 124, 125, 126 and 127 extend to the air cylinders of each of the subsidiary separating valves 106, 105, 115, 114 and 113 respectively. The purpose of these tubes is to permit lubricating oil to pass from the box 122 in measured quantities or drops to the bases of the respective air cylinders for the purpose of lubricating the internal surfaces of the cylinders, facilitating the operation of the pistons therein. Since the lower ends of the cylinders are closed and since some of the air admitted to the outer ends of the cylinders may find its way past the pistons into the inner ends of the cylinders, these pipes are also provided for allowing any of such air to pass off to the breather box 122, where it is discharged.

Extending from the top of each of the second set of subsidiary separating valves 113, 114 and 115 are discharge pipes 128, 129 and 130 respectively, which receive the oil from the upper chamber of each of the separating valves and direct it into the discharge compartment 131 supported in the upper end of the inner casing 34. A pipe 132 extends from the discharge compartment 131 to an oil discharge valve 133. A pipe 134 receives the oil from the valve 133 and directs it to any desirable place, such as storage tanks.

Arranged immediately over the oil and water compartment 46 are valves 135 and 136. These valves 135 and 136 receive the crude oil from the oil and water compartment 46, which crude oil has been returned to said compartment from the separating valves, as not being pure oil and as containing water or other impurities.

Pipes 137 and 138 extend upwardly from the top of the valves 135 and 136 to the compartment 27 at the top of the separator for directing the crude oil into said compartment from where it is again recirculated down through the tubes 28 for recirculation through the separator.

As shown in Fig. 1ᵇ, a source of fluid or air supply 139 communicates with automatic regulators 140 and 141 of suitable construction, one of which is connected with an air pipe 142, which extends upwardly beside the separator and is connected with the pipe 78 leading to the air cylinder of the master-valve 68 and also to a pipe 143 leading to the air cylinders of the first set of subsidiary separating valves 105 and 106 and a pipe 144 extending to the air cylinders of the second set of subsidiary separating valves 113, 114 and 115.

The pipes 142 and 145 have volume tanks 146 and 147 contained therein for cushioning the air pressure on the pistons.

*Operation*

In the operation of the separator or oil purifying system, the suction of the pump 48 at the base of the separator is applied through the separator to the pipe 17, the valve 2 and the pipe 1, for withdrawing the crude oil from the tank or other source with which the pipe 1 may be connected. The valve 2 regulates the amount of fluid drawn through the pipes and into the separator. The crude oil is discharged through the nozzle 20 onto the apex of the division shield 24 from where it flows down the sides of the cone-shaped shield and through the openings 26 and into the tubes 28. These tubes are relatively small in size but large in number and the flow of the crude oil is by both suction and gravity acting thereon. As the oil flows down through the tubes 28, it is heated by reason of the presence of steam within the heating chamber 35, which steam surrounds the tubes 28, through which the oil is passing.

The slow movement of the oil through these tubes facilitates a breaking up of the crude oil or the uniting of the waters, acids and oils in separate bodies, with a tendency to separate these from each other. The oils flow from the tubes 28 into the bottom chamber 33, from where they pass through the pump 48 into the pipe 49, under the pressure of the pump.

Throughout this movement the heat is maintained approximately constant for maintaining a uniform temperature for the crude oil passing through the tubes and as it also passes into the united breaking and receiving compartment 44 and through the separating valves and into the discharge compartment 131.

From the pipe 49 the oils pass upward through the section 50 and into the lubricator 53. The discharge pipe from the pump permits the oils to lubricate to the top of the pipe as the position of the pipe is changed, and, as all fluids are discharged from the lubricator 53 in this relation, the oils flow upward through the nipples 54 while the water and acids, uniting as a body and being heavier than the oils and more affected by gravity, flow downward through the bottom nipples 55. The oils lubricate and roll to the top of the water level uniting in a body above the body of the water.

The pressure created by the pump on the body of oil causes a heavy vapor or gas to rise from the oil, which accumulates in the top of the compartment 44, which gas is compressed as additional oil is forced into the compartment and acts as a cushion or creates an oscillation within the compartment with a tendency to force the oils and waters outward therefrom.

The placing of the water under the pressure of this gas causes it to become cooler whereas the pressure on the oil increases its temperature, which further tends to maintain the separate bodies of the oil and water.

Whenever the water level and oil level in the compartment 44 have reached a certain height, the pressure of the gas in the top of the compartment will act to create a pressure against the fluid pistons in the valve 57 for the discharge of the water and the master valve 68 for the discharge of the oil, but the height of the water is always maintained the same, and it is only when additional water and oil is forced into the compartment that there is a discharge. The water level is maintained in the compartment for the purpose of washing the oils and removing the water and acids therefrom as the oils roll and lubricate through the body of water.

A continuous and uniform pressure is maintained on the pistons, which regulate the valves at all times by the compressed air system; first to apply pressure to the oils; second, to raise the gravity by absorbing the vapor or gas, and thereby lowering the friction; third, to create a rolling process within the separating valves and to eliminate a direct pressure to be placed against the base of the cone-shaped division shields in the separating valves; fourth, to maintain a certain pressure of a definite speed of the flow of oil to the separating valves at all times; and, fifth, to hold the oil that has passed through the separating valves to prevent it from returning to the base of the separator.

The pressure on the body of oil forces this oil out through the pipe 67 into the lower chamber of the master separating valve 68 and up through this valve to the outer cone-shaped shield 91, through which it is forced through the tubes 92 which act to separate the oil from any water or acids that may be contained therein, and the oil being light in weight will flow up through the vertical tubes 93 into the piston 80, from where it is discharged through the openings 82 and 83 into the upper chamber 70 of the valve.

The water and acids that may be separated from the oil are directed downward into the discharge cup 94 and through the channels 96 to the bottom of the chamber 69, from where they are led downward through the pipes 97 into the oil and water chamber 46. The oil is forced upward through the several subsidiary separating valves and finally is discharged into the chamber 131, from which it is withdrawn from the separator.

As the oil passes through each of the series of separating valves, the purification and separating process continues for the purpose of withdrawing any impurities, such as water or acids, therefrom, all of which are returned to the oil and water chamber 46, from where they are forced back into the top chamber 27 for recirculation through the tubes 28 and the separator, while only the pure oil is discharged at the top.

The flow of oil into and through the separator may be regulated by each of the several valves provided therefor and the pressure on the pistons of the valves may also be regulated by the automatic regulators 140 and 141.

When the position of the piston 80 has been adjusted by the pinion 86, according to gravity and friction of crude oil, and a heavier fluid which carries greater friction with it such as water, acids and foreign substances, enters the valve 69 the piston will automatically raise, cutting off communication through the openings 82 and 83, thereby forcing this fluid back into the oil and water chamber 46, until this added friction is reduced according to the setting of the piston 86.

I claim:

1. An oil separating valve comprising separate chambers, a structure interposed between and for regulating the flow of fluid between said chambers, including spaced shields having a series of relatively small tubes arranged therebetween, and through which the oil is forced for the removal of impurities therefrom.

2. A separating valve of the character described comprising shields held in spaced relation, a plurality of relatively small tubes connected with each of said shields and projecting toward the other but disconnected from the other and extending in directions transverse to the directions of the tubes connected with the other shield.

3. An oil separating valve comprising inverted cone-shaped shields held in spaced relation, a plurality of relatively small tubes carried by each of said shields and projecting into the space between said shields and extending in directions transverse to the direction of the tubes of the other shield, the tubes of one shield being adapted to admit oil to the space between the shields for separation of the impurities therefrom, and the tubes of the other shield being adapted to withdraw the oil from said space.

4. An oil separating valve of the character described comprising upper and lower chambers, inverted cone-shaped shields interposed between said chambers and held in spaced relation, one of said shields having a plurality of relatively small tubes arranged horizontally in the space between the shields and communicating with a lower chamber and the other shield having a plurality of relatively small tubes projecting into the space in vertical positions and communicating with the upper chamber.

5. An oil separating valve of the character described comprising upper and lower chambers, inverted cone-shaped shields interposed between said chambers and held in spaced relation, one of said shields having a plurality of relatively small tubes arranged horizontally in the space between the shields and communicating with a lower chamber and the other shield having a plurality of relatively small tubes projecting into the space in vertical positions and communicating with the upper chamber, the oil having impurities separated therefrom by passage through the space between the shields, means for receiving the impurities therefrom, an oil and water chamber for receiving the impurities from said means, and means for recirculating the impurities through said separating valve.

6. An oil separating valve of the character described comprising separate chambers, a cylinder arranged between said chambers, a piston disposed within the cylinder for regulating the passage from one chamber to another, and flexible operating means for the piston.

7. An oil separating valve of the character described comprising separate chambers, a cylinder arranged between said chambers, a piston disposed witihn the cylinder for regulating the passage from one chamber to another, and operating means for the piston to move the same relative to the cylinder, said piston having relatively small openings for the passage of fluid thereinto.

8. An oil separating valve of the character described comprising a piston structure, approximately vertically arranged tubes through which a fluid passes to the piston, and approximately horizontally arranged tubes associated with said vertical tubes and through which the fluid passes thereto.

9. An oil separating valve of the character described comprising separate walls arranged approximately parallel and V-shape in cross-section, and having openings therethrough of relatively reduced size with tubes connected with the openings and extending in different directions for the passage of a fluid therethrough, and means for directing a fluid through the openings.

10. An oil separating valve of the character described comprising separate walls arranged approximately parallel and V-shaped in cross-section, and having openings therethrough of relatively reduced size for the passage of a fluid, approximately horizontally arranged tubes connected with the openings of one wall, and approximately vertically arranged tubes connected with the openings of the other wall.

11. An oil separating structure having spaced walls, approximately V-shape in cross-section, and having openings therethrough with tubes connected with the openings and extending in different directions for separating impurities from the oil passing through said openings, and means for forcing the oil through the openings.

12. An oil separating structure having spaced parallel walls, approximately V-shape in cross-section and having a plurality of tubes communicating therethrough with relatively minute openings therein for separating impurities from the oil passing through said openings, and means for forcing the oil through the openings.

13. An oil separating valve structure comprising spaced shields having a series of relatively small tubes arranged therebetween, and through which oil passes for the removal of impurities therefrom, the tubes of the different shields extending in transverse directions.

14. An oil separating structure comprising a casing having spaced shields therein dividing the casing into separate compartments, a series of relatively small approximately horizontal tubes connected with one of the shields and extending into the space between the shields for separating oil and impurities passing therethrough, means for directing oil and impurities through said tubes into the space between the shields, the other shield being perforated and arranged for passage of the oil therethrough in flowing from one compartment to another compartment, the perforations of the last mentioned shield being turned in a different direction from the openings through the tubes.

15. An oil separating valve of the character described comprising a chamber having a discharge opening, a floating piston mounted in the chamber and having means for controlling the discharge through said opening, and flexible means for adjusting the normal position of the piston relative to the discharge opening to permit the piston to rise automatically and reduce the discharge upon a substantial change in the character of fluid acting on the piston in the chamber.

16. An oil separating valve of the character described comprising a chamber having a discharge opening, a floating piston mounted in the chamber and controlling the discharge through said discharge opening, said piston carrying oil separating means for separating oil from impurities passing to the discharge opening, and flexible means for adjusting the normal position of the piston relative to the discharge opening and permitting the piston to rise automatically and cut off the discharge upon a substantial change in the character of fluid acting on the piston in the chamber.

17. An oil separating valve structure comprising spaced walls, said walls having a relatively large number of openings therein with tubes mounted in said openings, the tubes of one wall extending approximately horizontal and the tubes of the other wall extending approximately vertical, said tubes being arranged for separating impurities from oil passing through said walls, and means for forcing oil through the tubes.

WILBURN D. CHAMPION.